United States Patent
Folick et al.

(10) Patent No.: US 11,710,838 B2
(45) Date of Patent: Jul. 25, 2023

(54) AIR SYSTEM PRESSURE OBSERVER CONTROL METHOD FOR FUEL CELL SYSTEM

(71) Applicant: Toyota Motor Engineering & Manufacturing North America, Inc., Plano, TX (US)

(72) Inventors: Daniel C. Folick, Long Beach, CA (US); Jared M. Farnsworth, San Francisco, CA (US); Shigeki Hasegawa, Toyota (JP); Nobukazu Mizuno, Japan (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 294 days.

(21) Appl. No.: 17/092,095

(22) Filed: Nov. 6, 2020

(65) Prior Publication Data
US 2022/0149401 A1 May 12, 2022

(51) Int. Cl.
*H01M 8/04746* (2016.01)
*H01M 8/04089* (2016.01)

(52) U.S. Cl.
CPC ..... *H01M 8/04776* (2013.01); *H01M 8/04089* (2013.01); *H01M 8/04753* (2013.01); *H01M 2250/20* (2013.01)

(58) Field of Classification Search
CPC .................................................. H01M 8/04776
See application file for complete search history.

(56) References Cited

U.S. PATENT DOCUMENTS

| | | | |
|---|---|---|---|
| 7,808,204 B2 | 10/2010 | Matsumoto et al. | |
| 7,998,634 B2 | 8/2011 | Kurosaki et al. | |
| 9,281,532 B2 | 3/2016 | Lebzelter et al. | |
| 2012/0171590 A1 | 7/2012 | Matsumoto et al. | |
| 2019/0181477 A1* | 6/2019 | Farnsworth | H01M 8/24 |
| 2021/0197157 A1* | 7/2021 | Miyamoto | B01J 7/02 |

FOREIGN PATENT DOCUMENTS

| | | |
|---|---|---|
| CN | 110970642 A | 4/2020 |
| JP | 5304863 B2 | 10/2013 |

* cited by examiner

*Primary Examiner* — Brian R Ohara
(74) *Attorney, Agent, or Firm* — Snell & Wilmer LLP (57) ABSTRACT

A system for controlling gas flow in a fuel cell circuit includes a fuel cell stack, a pressure sensor, and a valve to adjust a flow of gas through the fuel cell circuit. The system further includes an ECU designed to estimate pressure values of the gas at multiple locations in the fuel cell circuit based on the detected pressure of the gas and based on flow resistance values (including at the valve), the estimated pressure values including an estimated sensor pressure value at a location of the pressure sensor. The ECU is further designed to determine a pressure deviation between the detected pressure and the estimated sensor pressure value. The ECU is further designed to adjust the flow resistance value of the valve to determine a final flow resistance value of the valve that causes the pressure deviation to reach or drop below a threshold deviation amount.

15 Claims, 6 Drawing Sheets

AIR SYSTEM PRESSURE OBSERVER CONTROL METHOD FOR FUEL CELL SYSTEM

BACKGROUND

1. Field

The present disclosure relates to systems and methods for controlling gas flow through a fuel cell stack of a fuel cell circuit based on a real-time model of the circuit and, more particularly, to systems and methods for compensating for discrepancies in values between the model and sensors located in the circuit.

2. Description of the Related Art

As the push for conservation of natural resources and reduced pollution advances, various concepts have been discovered to achieve such goals. These concepts range from harvesting wind and sun-based energy to various improvements in vehicle design. The vehicle improvements include new engines designed to improve fuel economy, hybrid vehicles that operate using a combination of an engine and a motor-generator to further improve fuel economy, fully electric vehicles that operate based on power stored in a battery, and fuel cell vehicles that generate electricity by facilitating a chemical reaction.

Many fuel cell vehicles include a fuel cell stack that includes multiple fuel cells. The fuel cells may receive a fuel, which typically includes hydrogen, along with oxygen (via air) or another oxidizing agent. The fuel cell stack may facilitate a chemical reaction between the hydrogen and oxygen. This chemical reaction generates electricity and water as a byproduct. The electricity generated by the fuel cell stack may be stored in a battery or directly provided to a motor-generator to generate mechanical power to propel the vehicle. While fuel cell vehicles are an exciting advancement in the automobile industry, the technology is relatively new, providing space for improvements to the technology.

Electrical output of the fuel cell stack varies based on a pressure and flow of the gases (e.g., hydrogen and air) located therein. The desired electrical output may be determined based on a power request which may be based on an acceleration request of the vehicle. In that regard, it is desirable to accurately control the pressure and flow of the gases into the fuel cell stack to achieve the desired electrical output in a timely manner. However, it is important to know the states of the various elements within the gas supply circuits (e.g., pipes, valves, compressors, etc.) in order to accurately control the fuel cell stack.

Thus, there is a need in the art for systems and methods for accurately controlling gas supply to a fuel cell stack of a vehicle.

SUMMARY

Described herein is a system for controlling gas flow in a fuel cell circuit of a vehicle. The system includes a fuel cell stack having a plurality of fuel cells and configured to receive a gas. The system further includes a pressure sensor configured to detect a pressure of the gas in the fuel cell circuit. The system further includes a valve having a valve position and configured to adjust a flow of the gas through at least a portion of the fuel cell circuit. The system further includes an electronic control unit (ECU) coupled to the pressure sensor and the valve. The ECU is designed to estimate pressure values corresponding to pressures of the gas at multiple locations in the fuel cell circuit including at the fuel cell stack based on the detected pressure of the gas and based on flow resistance values including a flow resistance value of the valve, the estimated pressure values including an estimated sensor pressure value corresponding to an estimated pressure of the gas at a location of the pressure sensor. The ECU is further designed to determine a pressure deviation between the detected pressure of the gas and the estimated sensor pressure value. The ECU is further designed to adjust the flow resistance value of the valve until a final flow resistance value of the valve is determined that causes the pressure deviation to be reduced to or below a threshold deviation amount.

Also disclosed is a system for controlling gas flow in a fuel cell circuit of a vehicle. The system includes a fuel cell stack having a plurality of fuel cells and configured to receive a gas. The system further includes a pressure sensor configured to detect a pressure of the gas in the fuel cell circuit. The system further includes a valve having a valve position and configured to adjust a flow of the gas through at least a portion of the fuel cell circuit. The system further includes a plurality of pipes configured to port the gas through the fuel cell circuit. The system further includes an electronic control unit (ECU) coupled to the pressure sensor and the valve. The ECU is designed to estimate pressure values corresponding to pressures of the gas at multiple locations in the fuel cell circuit including at the fuel cell stack and at least one of the plurality of pipes based on the detected pressure of the gas and based on flow resistance values including a flow resistance value of the valve and flow resistance values of the plurality of pipes, the estimated pressure values including an estimated sensor pressure value corresponding to an estimated pressure of the gas at a location of the pressure sensor. The ECU is further designed to determine a pressure deviation between the detected pressure of the gas and the estimated sensor pressure value. The ECU is further designed to adjust the flow resistance value of the valve until a final flow resistance value of the valve is determined that causes the pressure deviation to be reduced to or below a threshold deviation amount.

Also disclosed is a method for controlling gas flow in a fuel cell circuit of a vehicle. The method includes detecting, by a pressure sensor, a detected pressure of gas in the fuel cell circuit. The method further includes estimating, by an electronic control unit (ECU), pressure values corresponding to pressures of the gas at multiple locations in the fuel cell circuit including at a fuel cell stack based on the detected pressure of the gas and based on flow resistance values including a flow resistance value of a valve, the estimated pressure values including an estimated sensor pressure value corresponding to an estimated pressure of the gas at a location of the pressure sensor. The method further includes determining, by the ECU, a pressure deviation between the detected pressure of the gas and the estimated sensor pressure value. The method further includes adjusting, by the ECU, the flow resistance value of the valve until a final flow resistance value of the valve is determined that causes the pressure deviation to be reduced to or below a threshold deviation amount.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for controlling a flow of gas, such as air, within a fuel cell circuit. The systems and methods provide various advantages and benefits such as controlling various actuators of the circuit based on a real-time model of the circuit. This advantageously provides for accurate state determination of each element of the circuit using relatively few sensors, which beneficially reduces a cost of the system. In particular, the real-time model beneficially determines the state of each component using only a single pressure sensor and a single flow sensor. The systems and methods further advantageously utilize algorithms to determine discrepancies between measured sensor values and values determined by the model. The systems and methods provide the benefit of compensating for the discrepancies using real-time calculations to rapidly reduce or eliminate the discrepancies, thus increasing accuracy of the model.

An exemplary system includes a fuel cell circuit having a fuel cell stack which receives a flow of gas, such as air. The system further includes a valve that has a valve position that can be adjusted to adjust a pressure of the gas in the fuel cell circuit. The system further includes pressure sensor that detects a pressure of the gas at a location in the fuel cell circuit. The system further includes an electronic control unit (ECU). The ECU is designed to run a real-time model of the fuel cell circuit to determine a current state (e.g., pressure and flow values of the gas) of each element in the fuel cell circuit. The ECU can further determine a pressure deviation corresponding to a discrepancy between the detected pressure and the pressure determined by the real-time model. The ECU can also adjust values of the real-time model based on the discrepancy to reduce the pressure deviation to or below a threshold deviation amount. The ECU can further control the valve and other actuators of the circuit based on the updated real-time model.

Figure 1:
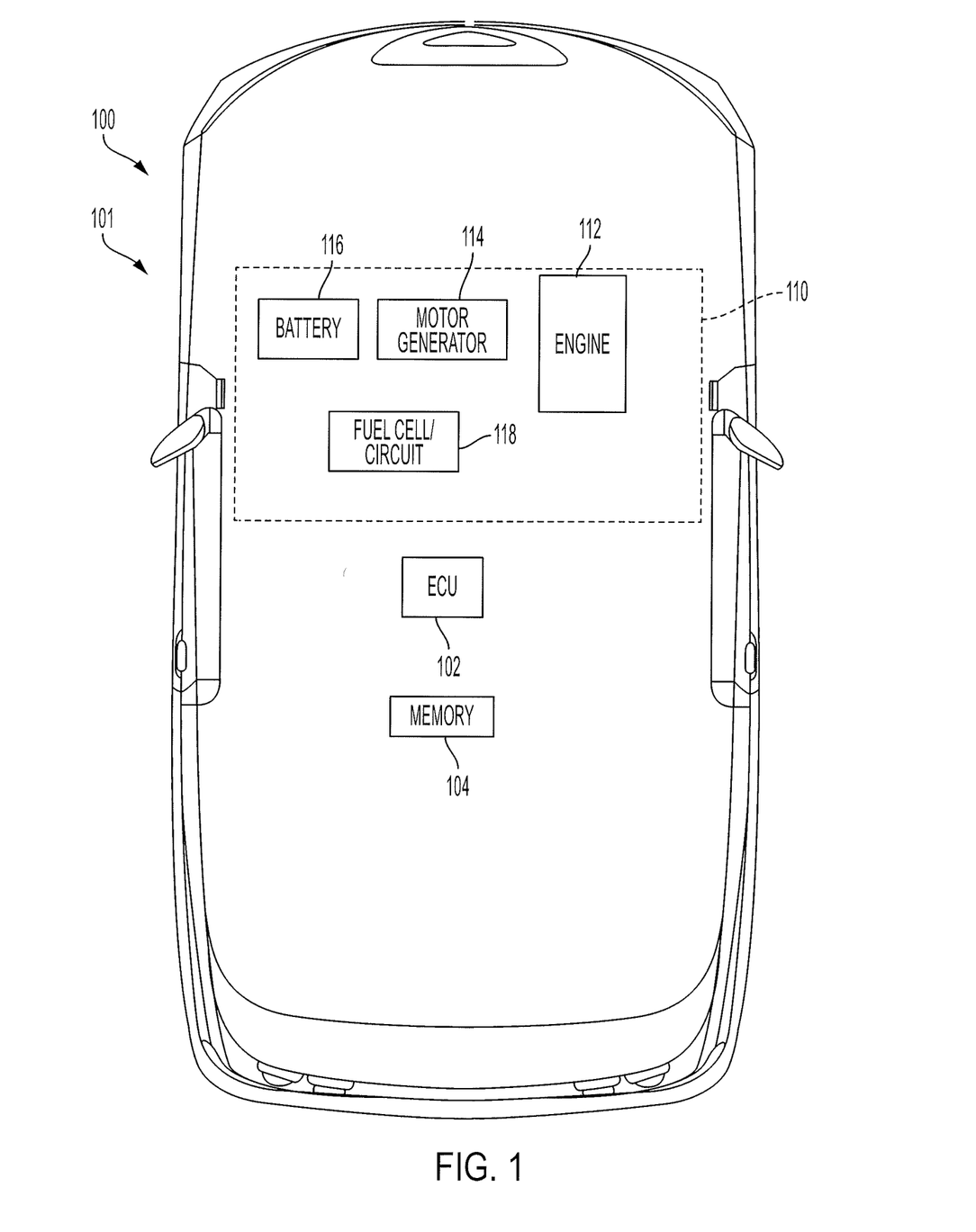
FIG. 1 is a block diagram illustrating various components of a vehicle having a fuel cell circuit capable of generating electricity based on a chemical reaction according to an embodiment of the present invention.

Turning to FIG. 1, a vehicle 100 includes components of a system 101 for providing gas, such as air, to fuel cells. In particular, the vehicle 100 and system 101 include an ECU 102 and a memory 104. The vehicle 100 further includes a power source 110 which may include at least one of an engine 112, a motor-generator 114, a battery 116, and/or a fuel cell circuit 118. The fuel cell circuit 118 may be a part of the system 101.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination location.

The memory 104 may include any non-transitory memory known in the art. In that regard, the memory 104 may store machine-readable instructions usable by the ECU 102 and may store other data as requested by the ECU 102 or programmed by a vehicle manufacturer or operator. The memory 104 may store a model of the fuel cell circuit 118. The model may include equations or other information usable to estimate various parameters of the fuel cell circuit 118. That is, the model of the fuel cell circuit may determine a current or present state of each component (e.g., actuators, pipes, or the like) of the fuel cell circuit 118. The state of each component may include a pressure value (e.g., both at an inlet and at an outlet of the component) and a flow value through the component. The model may be a real-time model or a near-real-time model which continuously or periodically (e.g., at least every second, at least every half second, at least every tenth of a second, every one hundredth of a second, or the like) determines new states for each component.

The engine 112 may convert a fuel into mechanical power. In that regard, the engine 112 may be a gasoline engine, a diesel engine, or the like.

The battery 116 may store electrical energy. In some embodiments, the battery 116 may include any one or more energy storage device including a battery, a fly-wheel, a super-capacitor, a thermal storage device, or the like.

The fuel cell circuit 118 may include a plurality of fuel cells that facilitate a chemical reaction to generate electrical energy. For example, the fuel cells may receive hydrogen and oxygen, may facilitate a reaction between the hydrogen and oxygen, and may output electricity in response to the reaction. In that regard, the electrical energy generated by the fuel cell circuit 118 may be stored in the battery 116 or directly utilized by the motor-generator 114 or another component of the vehicle 100 (e.g., a heating-ventilation-air conditioning (HVAC) unit). In some embodiments, the vehicle 100 may include multiple fuel cell circuits including the fuel cell circuit 118.

The motor-generator 114 may convert the electrical energy stored in the battery (or electrical energy received directly from the fuel cell circuit 118) into mechanical power usable to propel the vehicle 100. The motor-generator 114 may further convert mechanical power received from the engine 112 or wheels of the vehicle 100 into electricity, which may be stored in the battery 116 as energy and/or used by other components of the vehicle 100 (e.g., an HVAC system). In some embodiments, the motor-generator 114 may also or instead include a turbine or other device capable of generating thrust.

Figure 2:
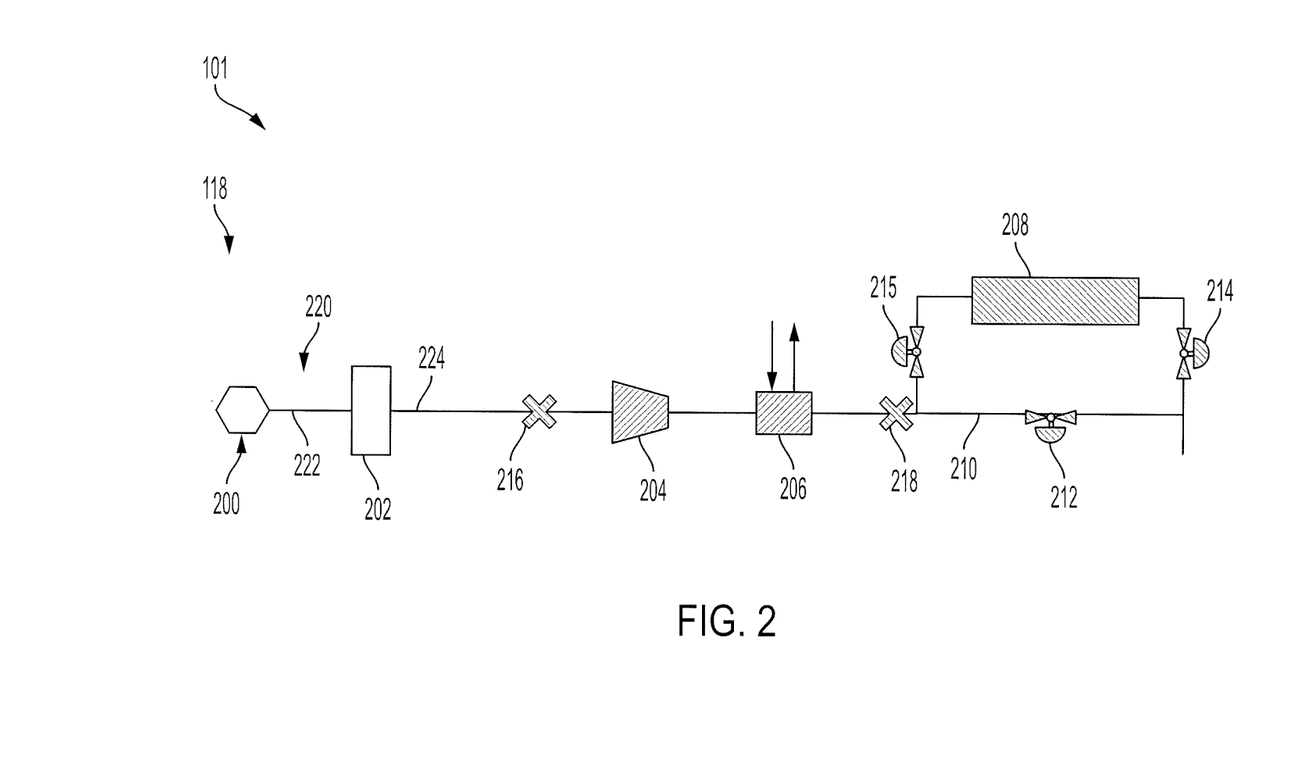
FIG. 2 is a block diagram illustrating various features of the fuel cell circuit of FIG. 1 according to an embodiment of the present invention.

Turning now to FIG. 2, additional details of the fuel cell circuit 118 are illustrated. In particular, the fuel cell circuit 118 includes an air intake 200, an air cleaner 202, a compressor 204, an intercooler 206, a fuel cell stack 208, a bypass branch 210, a bypass valve 212 positioned along the bypass branch 210, a restriction valve 214, and an inlet valve 215.

The air intake 200 may receive air from an ambient environment, such as outside of the vehicle 100 of FIG. 1. In some embodiments, the air intake 200 may include a filter for filtering debris from the received air. The air cleaner 202 may include a filter or other device capable of removing debris and other impurities from the air received from the air intake 200.

The compressor 204 may be a turbo compressor or other compressor capable of pressurizing air. In that regard, the compressor 204 may draw air from the cleaner 202 and may output pressurized air.

Figure 3:
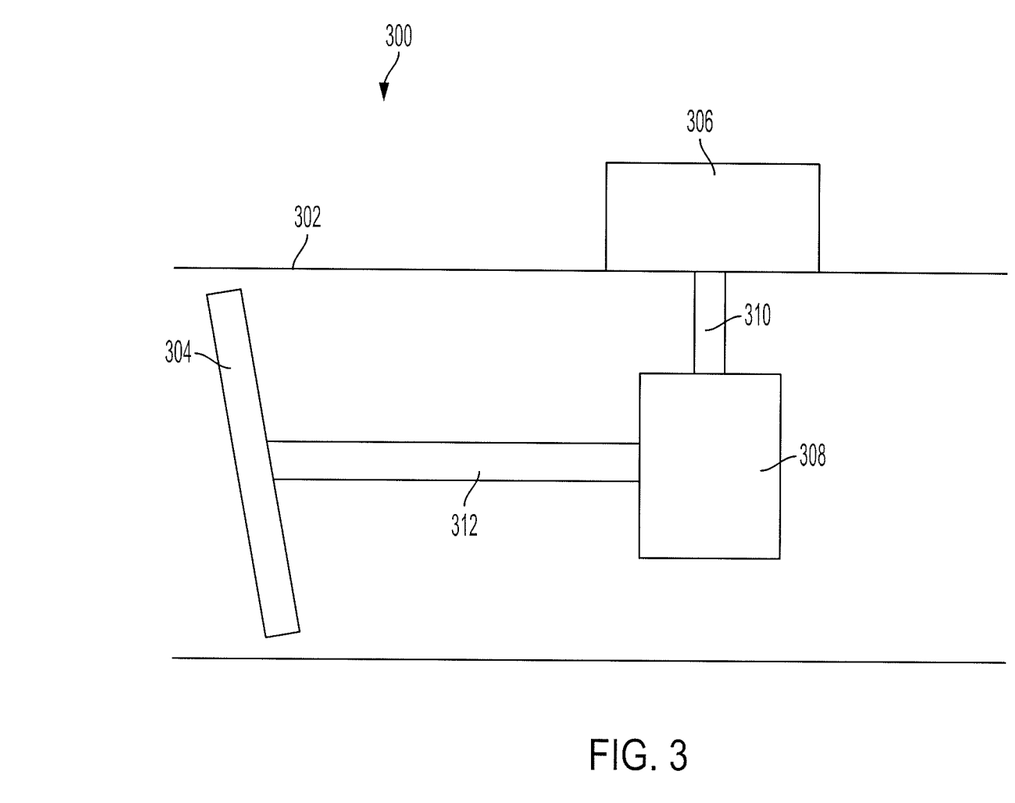
FIG. 3 is cross-sectional view of an exemplary valve for use in a fuel cell circuit according to an embodiment of the present invention.

With brief reference to FIG. 3, an exemplary valve 300 may be used as any of the valves of FIG. 2. In particular, the valve 300 includes a body 302 through which air may be drawn. A plug 304, which may include any shape, may be located inside of the body 302. A motor 306 (or other power source such as an electric actuator) may generate mechanical power which may be received by a gearbox 308 via a shaft 310. The gearbox 308 may transfer the power received from the motor 306 to a shaft 312 connected to the plug 304. The mechanical power from the gearbox 308 may be applied to the plug 304 via the shaft 312 to change position of the plug 304 relative to the body 302 in order to adjust a valve position of the valve 300 (e.g., to increase or decrease flow of the fluid through the valve 300). One skilled in the art will realize that a valve as used herein may have similar features as the valve 300 or different features without departing from the scope of the present disclosure.

Returning reference to FIG. 2, the fuel cell circuit 118 may further include an intercooler 206. The intercooler 206 may receive the air from the compressor 204 and may also receive a fluid, such as a coolant. The intercooler 206 may at least one of transfer thermal energy (i.e., heat) from the air to the coolant or transfer heat from the coolant to the air. In that regard, the intercooler 206 may adjust a temperature of the air flowing through the fuel cell circuit 118.

The fuel cell stack 208 may include a plurality of fuel cells. The fuel cells may receive hydrogen along with the air from the intercooler 206. The fuel cells may facilitate a chemical reaction between the oxygen in the air and the hydrogen, which may generate electricity.

The air from the intercooler 206 may be split such that some of the air flows through the fuel cell stack 208 and some of the air flows through the bypass branch 210. In that regard, the air flowing through the bypass branch 210 fails to flow through the fuel cell stack 208. The bypass valve 212 may have an adjustable valve position. The adjustable valve position of the bypass valve 212 may be controlled to adjust an amount of airflow through the bypass branch 210 and, likewise, to adjust an amount of airflow through the fuel cell stack 208. For example, when the bypass valve 212 is 100 percent (100%) closed then all the airflow through the fuel cell circuit 118 flows through the fuel cell stack 208.

Although discussion may reference airflow through the fuel cell circuit 118, one skilled in the art will realize that any other gas flow may be substituted for the airflow without departing from the scope of the present disclosure. For example, a similar circuit may be utilized to provide hydrogen or another gas to the fuel cell stack 208.

The restriction valve 214 may likewise have an adjustable valve position. The adjustable valve position of the restriction valve 214 may be controlled to adjust a pressure of the air within the fuel cell stack 208. For example, the pressure within the fuel cell stack 208 may be increased by closing the restriction valve 214 and the pressure may be decreased by opening the restriction valve 214.

The inlet valve 215 may also have an adjustable valve position. The adjustable valve position of the inlet valve 215 may be controlled to adjust a pressure of the air received by the fuel cell stack 208. For example, the pressure of the air provided to the fuel cell stack 208 may be reduced by closing the inlet valve 215 and the pressure may be increased by opening the inlet valve 215.

Referring to FIGS. 1 and 2, each of the compressor 204, the bypass valve 212, the restriction valve 214, and the inlet valve 215 may be considered actuators and may be controlled by the ECU 102. For example, the ECU 102 may receive a power request from a driver of the vehicle (or may generate a power request in an autonomous or semi-autonomous vehicle). The ECU 102 may convert the power request into at least one of a desirable pressure value or a desirable flow value corresponding to a desirable pressure or a desirable airflow at specific locations within the fuel cell circuit 118. The ECU 102 may then control each of the compressor 204, the bypass valve 212, the restriction valve 214, and the inlet valve 215 in order to achieve the desirable pressure or flow values.

The fuel cell circuit 118 may further include a flow sensor 216 and a pressure sensor 218. The flow sensor 216 may detect a flow of the gas (such as a mass flow) through the compressor 204. The pressure sensor 218 may detect a pressure of the gas at an outlet of the intercooler 206. In some embodiments, the flow sensor 216 and the pressure sensor 218 may be positioned at different locations within the fuel cell circuit 118 without departing from the scope of the present disclosure.

The fuel cell circuit 118 may further include a plurality of pipes 220. For example, the plurality of pipes 220 may include a first pipe 222 that transfers the gas from the intake 200 to the air cleaner 202 and a second pipe 224 that transfers the gas from the air cleaner 202 to the flow sensor 216. In some embodiments, two or more components (e.g., the intake 200, the air cleaner 202, or the flow sensor 216) may be directly connected without any pipes.

Figure 4:
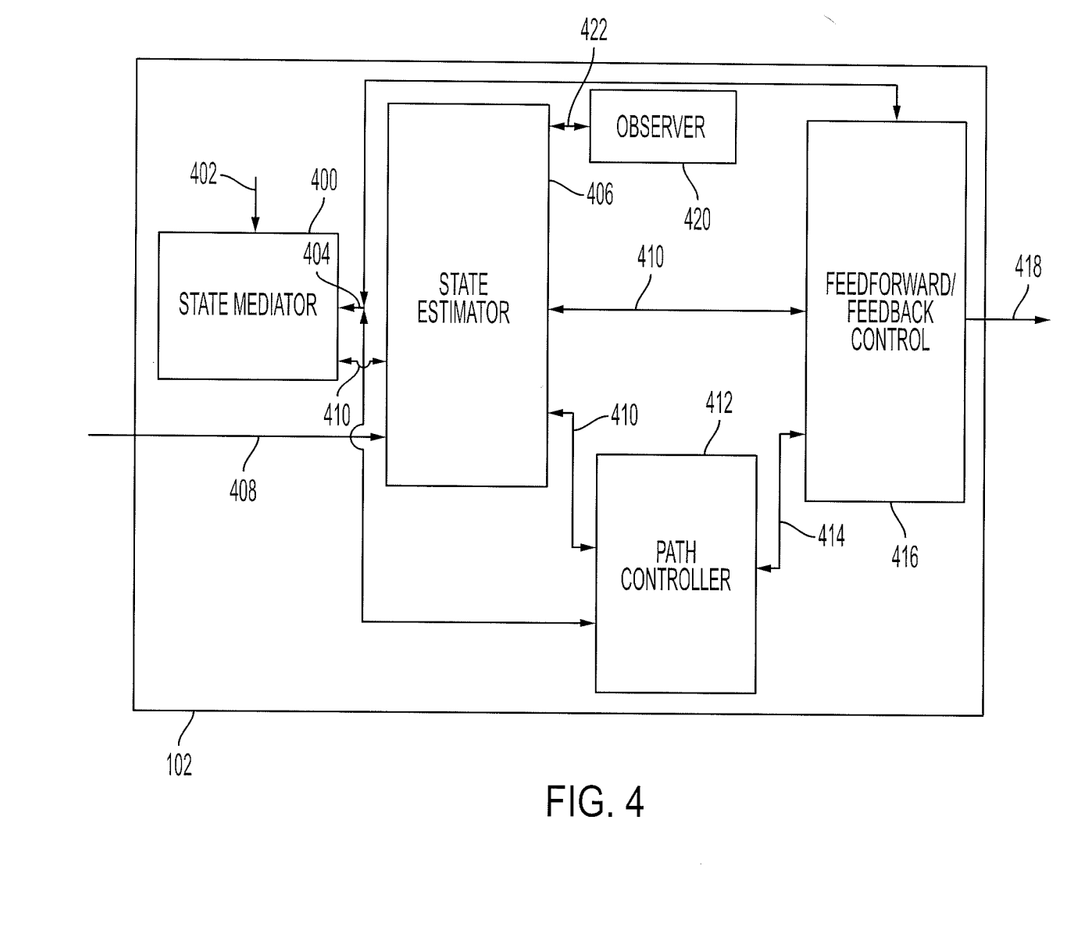
FIG. 4 is a block diagram illustrating various logic components of an electronic control unit (ECU) of the vehicle of FIG. 1 for providing a gas to the fuel cell circuit at a desirable flow rate and pressure according to an embodiment of the present invention.

Referring now to FIGS. 2 and 4, the ECU 102 may include various processes or functions for controlling the fuel cell circuit 118. The processes or functions within the ECU 102 may each be implemented in hardware (i.e., performed by a dedicated hardware), may be implemented in software (i.e., a general-purpose ECU running software stored in a non-transitory memory), or may be implemented via a combination of hardware and software. The functions described with reference to FIG. 4 may be used to create a real-time or near-real-time model of the fuel cell circuit 118 and to control the various actuators of the fuel cell circuit 118 based on the model. A near-real-time model refers to the fact that the ECU 102 may determine states of the components of the fuel cell circuit 118 within 0.5 seconds, within 1 second, within 2 seconds, within 5 seconds, or the like of the present time.

In particular, the ECU 102 may include a state mediator 400. The state mediator 400 may receive a control signal 402 corresponding to desirable pressure and/or flow values (i.e., at least one target pressure value or at least one target flow value). The control signal 402 may likewise correspond to a power request. The state mediator 400 may analyze the target pressure and flow values and determine whether the target values are feasible based on the mechanics of the fuel cell circuit 118 and whether one or more component of the fuel cell circuit 118 is likely to become damaged in an attempt to meet a target value. The state mediator 400 may then output mediated target values 404 that are feasible by the fuel cell circuit 118 and that are unlikely to damage a component of the fuel cell circuit 118.

The ECU 102 may further include a state estimator 406. The state estimator 406 may receive sensor data 408 detected by the flow sensor 216 and the pressure sensor 218. The state estimator 406 may calculate or estimate current pressure values and flow values corresponding to each component of the fuel cell circuit 118 (including the plurality of pipes 220). That is, the state estimator 406 may calculate or estimate a current state of each component of the fuel cell circuit 118 based on the detected data from the flow sensor 216 and from the pressure sensor 218. The state estimator 406 may output the current estimated values 410. In some embodiments, the current estimated values 410 may be used by the state mediator 400 in determining the mediated target values 404.

The state estimator 406 is advantageous as it can accurately determine or estimate pressure and flow values for each component of the fuel cell circuit based on data from only the two sensors. However, one skilled in the art will realize that the present disclosure applies equally a system having a different configuration of sensors than shown herein (e.g., greater or fewer sensors, only pressure sensors, only flow sensors, or the like).

The state estimator 406 may calculate or estimate the current pressure values and the current flow values based on the detected pressure data and the detect flow data, along with the flow resistance of each element of the fuel cell circuit 118. The flow resistance of various elements (e.g., the pipes 220) may be constant values that are based on the diameter of the elements. In addition, the flow resistance of various other elements (e.g., the compressor 204 and the valves 212, 214, 215) may vary based on the state of the components. For example, the flow resistance of the valve 212 may vary based on the valve position of the valve (i.e., the flow resistance may increase in response to the valve closing, and the flow resistance may decrease in response to the valve opening). The state estimator 406 may estimate the flow resistance of the compressor 204 and the valves 212, 214, 215 based on the current state of the actuators (e.g., the compressor speed and the valve positions). However, external factors may affect the flow resistance beyond the state of the actuators. For example, water may collect in the valves 212, 214, 215 or the compressor 204, thus affecting the flow resistance and causing the state estimator to incorrectly estimate the pressure and flow values of the various components of the fuel cell circuit 118.

The ECU 102 may also include a path controller 412. The path controller 412 may receive the current estimated values 410 along with the mediated target values 404. The path controller 412 may identify a desirable path of control of the compressor 204 from the current estimated values 410 to the mediated target values 404. The path controller 412 may determine and output desirable intermediate targets 414 that lay along the desirable path from the current estimated values 410 to the mediated target values 404.

The ECU 102 may also include a feedforward and feedback control 416. The feedforward and feedback control 416 may receive the desirable intermediate targets 414 along with the mediated target values 404 and the current estimated values 410. The feedforward and feedback control 416 may determine and output control signals 418 that may control operation of the actuators of the fuel cell circuit 118. In various embodiments, the ECU may lack the path controller 412 without departing from the scope of the present disclosure.

As referenced above, the pressure and flow values determined by the state estimator 406 may be incorrect due to variances in the actual flow resistance values. In that regard, the ECU 102 may further include an observer controller 420. The observer controller 420 may receive data 422 from the state estimator 406 (including the detected pressure at the location of the pressure sensor 218 of FIG. 2, the estimated pressure values at the location of the pressure sensor 218, and potentially the pressure values, flow values, and flow resistance values determined by the state estimator 406).

The observer controller 420 may further determine a pressure deviation between the detected pressure and the estimated pressure values. For example, the observer controller 420 may compare the detected pressure value from the pressure sensor 218 to the estimated pressure value (from the state estimator 406) at the location of the pressure sensor 218. The observer controller 420 may then adjust values (e.g., flow resistance values) of one or more component (e.g., the bypass valve 212, the restriction valve 214, the inlet valve 215, or the compressor 204) until the pressure deviation reduces to or below a threshold deviation amount. That is, the observer controller 420 may adjust the flow resistance values of one or more component and continue to compare the detected pressure value to newly estimated pressure values determined by the state estimator 406 until the pressure deviation reaches or drops below the threshold. The threshold deviation amount may be a pressure deviation value that is sufficiently low that little to no effect on operation of the fuel cell circuit 118 occurs in response to the estimated pressure values being used. For example, the observer controller 420 may adjust a flow resistance value of one or more component until the pressure deviation reaches or drops below the threshold deviation amount. The observer controller 420 may also transmit data 422 to the state estimator which may include the updated flow resistance values.

In some embodiments, the observer controller 420 may also select a component that is most likely to be the source of the deviation. The observer controller 420 may select the component based on the status of the component. For example, if the bypass valve 212 is 50% open, the restriction valve 214 is 90% closed, and the inlet valve 215 is 100% open, the observer controller 420 may select the bypass valve as the deviated valve (i.e., the valve most likely to be the source of the deviation) as valves may be most likely to have a deviation in flow resistance as the valve position becomes farther from full a closed position (and/or a fully open position). This may be due to various factors such as, for example, water collecting in the respective valve and choking the flow through the valve (and, thus, increasing the flow resistance). In that regard and continuing the example above, the observer controller 420 may also or instead select both of the bypass valve 212 and the restriction valve 214 as deviated valves. The observer controller 420 may determine new flow resistance values for any one or more deviated valve.

In some embodiments, the observer controller 420 may be' programmed to always assume that one or more of the valves 212, 214, 215 is always the deviated valve (and, thus, its estimated flow resistance is the likely source of the pressure deviation). For example, the observer controller 420 may always assume that the bypass valve 212 is the deviated valve, that the restriction valve 214 is the deviated valve, that the inlet valve 215 is the deviated valve, or that any combination of valves 212, 214, 215 are deviated valves. In such embodiments, the observer controller 420 may always calculate new flow resistance values for any of the predetermined deviated valves.

Figure 5:
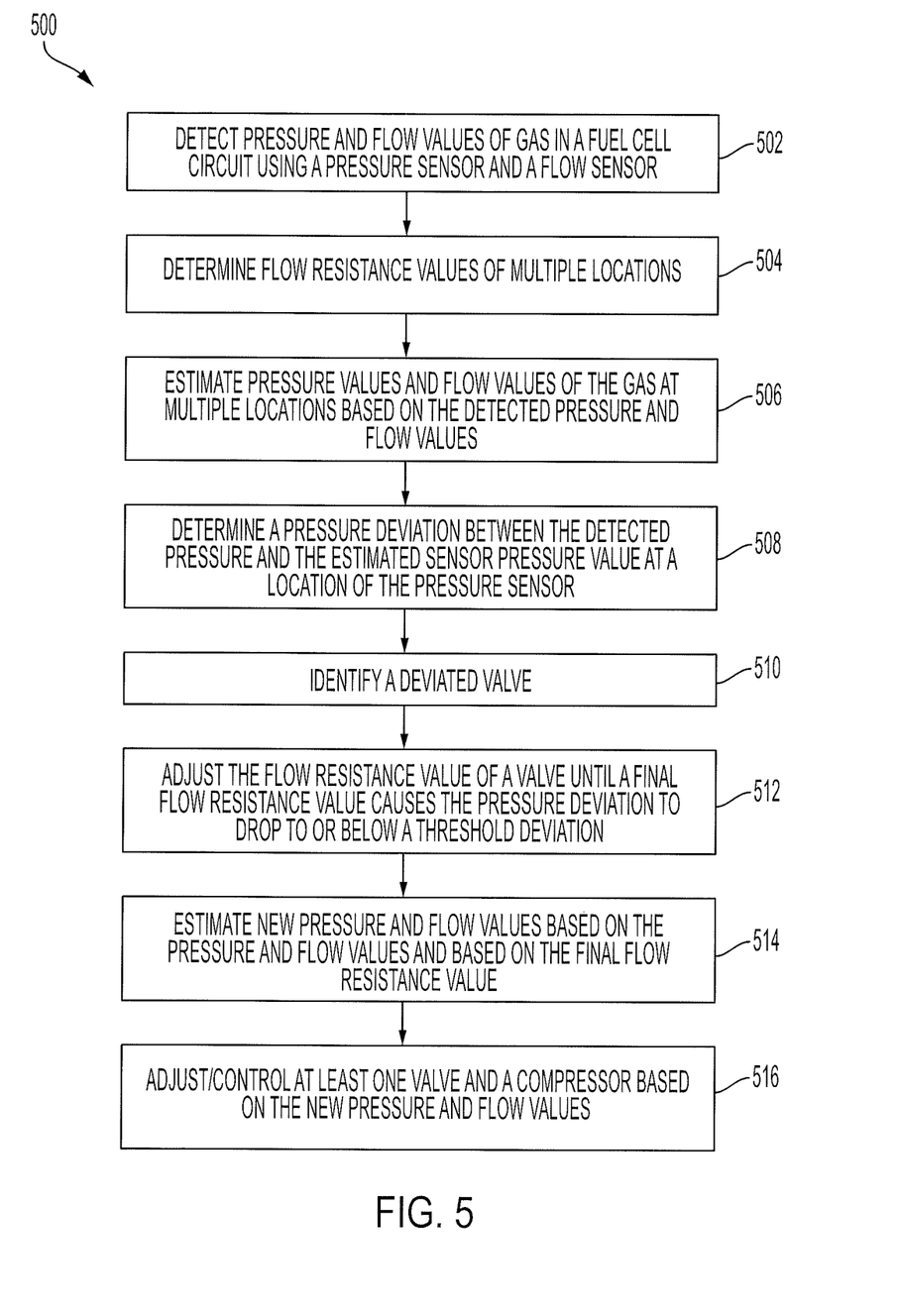
FIG. 5 is a flowchart illustrating a method for estimating pressure and flow values for multiple components of a fuel cell circuit and compensating for a deviation between an actual pressure and an estimated pressure according to an embodiment of the present invention.

Turning now to FIG. 5, a method 500 for controlling flow of a gas, such as air, through a fuel cell circuit (e.g., the fuel cell circuit 118 of FIG. 2) is shown. The method 500 may be performed by a system similar to the system 101 of FIG. 1. Furthermore, the operations of the method 500 may be performed by control blocks (e.g., the observer controller 420) of an ECU having similar features as the ECU 102 of FIG. 4.

The method 500 may begin in block 502 in which a pressure sensor of a fuel cell circuit detects a detected pressure of gas (e.g., air) in the fuel cell circuit. A flow sensor may also detect a detected flow value corresponding to a flow of the gas (e.g., a mass flow) through the fuel cell circuit. In some embodiments, the fuel cell circuit may only include two sensors: a single pressure sensor and a single flow sensor.

In block 504, the ECU may determine or estimate flow resistance values for each component in the fuel cell circuit. In some embodiments, some flow resistance values may be known (or assumed to be known, e.g., for pipes), and some flow resistance values may be estimated or calculated based on a position of the component (e.g., for the compressor and the valves). In some embodiments, the ECU may determine or estimate the flow resistance values at least partially based on the detected pressure value or the detected flow value. In some embodiments, the ECU may determine or calculate the flow resistance values based on estimated pressure and flow values determined in block 506.

In block 506, the ECU may then determine or estimate pressure values and flow values of the gas at some or all locations in the fuel cell circuit. For example, the ECU may determine or calculate pressure values at inlets and outlets of each element (e.g., the compressor, the pipes, the valves, the fuel cell stack, etc.). The ECU may further calculate flow values of the gas through each element (in some embodiments, the ECU may assume that the flow values at inlets of components are equal to the flow values at outlets of the same component). The ECU may determine or calculate the pressure and flow values based on the flow resistance values determined in block 504, based on the detected pressure and flow values detected in block 502, and based on previously estimated flow and/or pressure values.

In block 508, the ECU (e.g., an observer controller of the ECU) may receive the detected pressure value and the estimated pressure value corresponding to the location of the pressure sensor. The ECU may then determine a pressure deviation between the detected pressure value and the estimated pressure value at the location of the pressure sensor. The pressure deviation corresponds to a difference between the estimated value and the detected value. A relatively large pressure deviation may indicate that a value used in the calculation of the estimated pressure values is incorrect. Due to the calculations used, the ECU may assume that the incorrect value is a flow resistance value. Furthermore, due to the fact that the flow resistance values of valves may vary by a greater amount than other components (and due to the fact that the estimate of flow resistance of the valves may vary significantly from the actual flow resistance values), the ECU may determine that the determined flow resistance value of one or more valve may be incorrect.

In block 510, the ECU may identify a deviated valve. For example, the ECU may determine which one or more valve is most likely to have an incorrect flow resistance value. The ECU may make this determination based on any one or more factor. For example, the ECU may select any one or more valve having a valve position that is farthest from a fully open or a fully closed position as the deviated valve. As another example, the ECU may select a valve that is most likely to have water therein (e.g., may either select a single valve that is always most likely to have water therein or may select a valve that is most likely to have water therein based on a current state of the fuel cell circuit). The ECU may assign the valve determined to be most likely to have water therein as a deviated valve because water can change the flow resistance of the valve. As yet another example, the ECU may keep track of adjustments to calculations of flow resistance that the ECU has previously performed, and may select the valve having the most, or greatest, adjustments thereto as the deviated valve.

In block 512, the ECU may adjust the determined flow resistance of the deviated valve and calculate new pressure and flow values based on the adjusted flow resistance value. The ECU may then determine a new pressure deviation between the detected pressure and the determined pressure at the location of the pressure sensor. The ECU may continue to perform blocks 508 and 512 until the pressure deviation drops to or below a threshold deviation amount. The threshold deviation amount may correspond to an amount of deviation that is unlikely to cause undesirable effects to operation of the fuel cell in response to the fuel cell circuit being controlled based on the estimated pressure and flow values.

The ECU may perform blocks 508 and 512 using a proportional-integral-derivative (PID) controller. In that regard, the ECU may incrementally increase or decrease the flow resistance value of the deviated valve until the pressure deviation reaches or drops below the threshold deviation amount. In some embodiments, the ECU may increase or decrease the flow resistance value of the deviated valve by varying amounts based on the pressure deviation. For example, the ECU may adjust the flow resistance value by a greater amount in response to a greater pressure deviation, and may adjust the flow resistance value by a lesser amount in response to a smaller pressure deviation. In some embodiments, the ECU may be capable of closing most of the pressure deviation by calculating a flow resistance value that is most likely to greatly reduce the pressure deviation.

The flow resistance value that results from the iterations of blocks 508 and 512 may be regarded as a temporary final flow resistance value.

In block 514, the ECU may estimate new pressure and flow values based on the previously determined flow resistance values, the detected pressure and flow values, the real-time model of the state estimator, and the temporary final flow resistance value. For example, the estimations may be performed in a similar manner as in block 506.

In block 516, the ECU may adjust or control one or more actuator of the fuel cell circuit (e.g., the compressor and the valves) based on the new pressure and flow values. This may be performed using a feedforward/feedback controller of the ECU. For example, the ECU may receive a target pressure value corresponding to target pressure of the gas at the fuel cell stack. The target pressure value may be received from a higher-level controller and may correspond to an electrical current request received by the higher-level controller. The ECU may adjust the operation of the one or more actuator to achieve the target pressure value using the real-time model (i.e., the estimated pressure and flow values).

Figure 6:
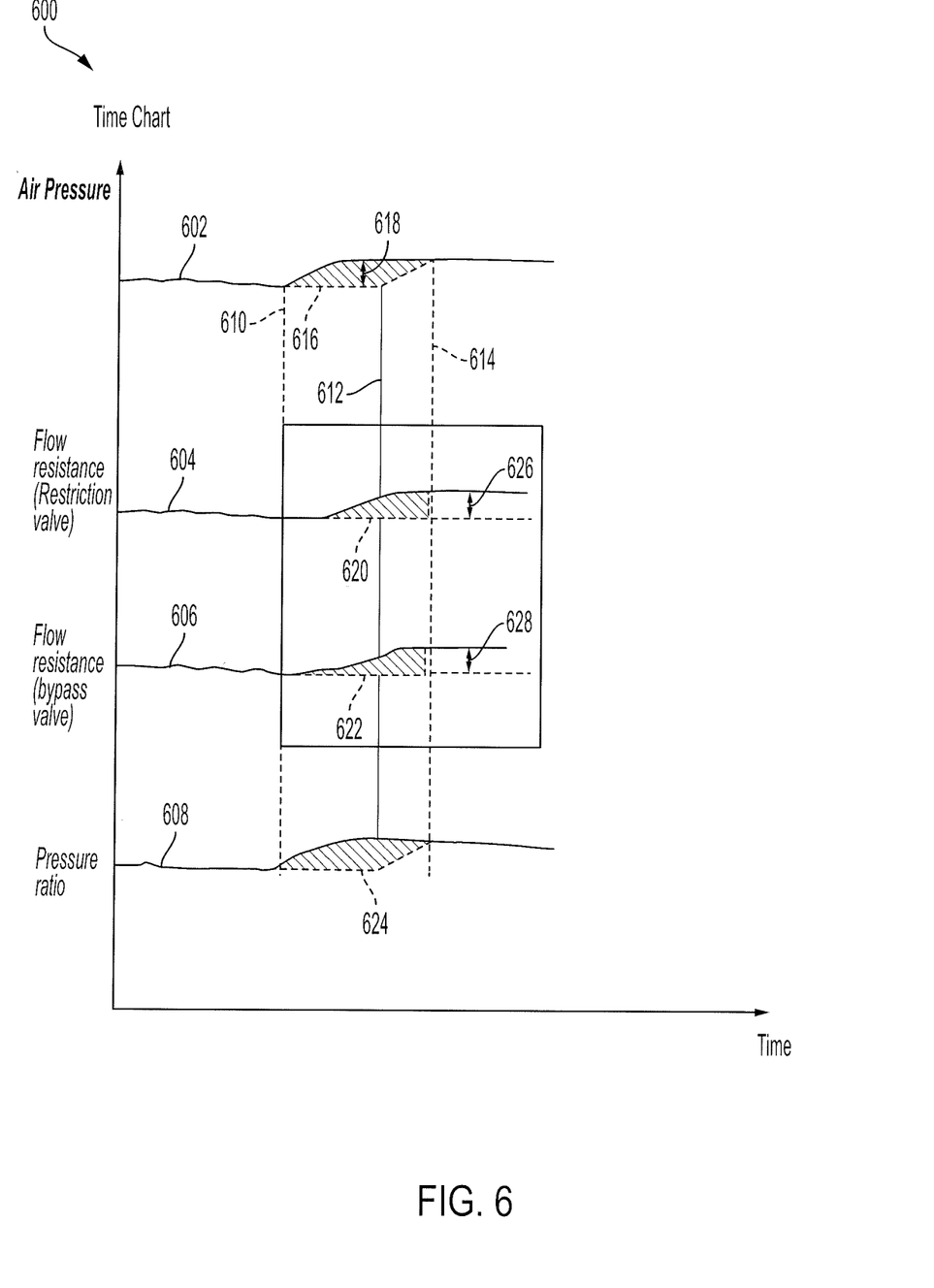
FIG. 6 is a time chart illustrating an exemplary operation of the method of FIG. 5 according to an embodiment of the present invention.

Turning now to FIG. 6, a time plot 600 of pressure values, flow resistance values, and pressure ratios illustrate an exemplary implementation of a method similar to the method 500 of FIG. 5. The X-axis illustrates time and the Y-axis illustrates values of air pressure at a location of the pressure sensor (illustrated by a line 602, e.g., the pressure sensor 218 of FIG. 2), a flow resistance value of a restriction valve (illustrated by a line 604, e.g., the restriction valve 214 of FIG. 2), a flow resistance value of a bypass valve (illustrated by a line 606, e.g., the bypass valve 212 of FIG. 2), and a pressure ratio of a compressor (illustrated by a line 608, e.g., the compressor 204 of FIG. 2).

As shown, the air pressure, the flow resistances, and the pressure ratio all have actual and estimated values that are correct from the beginning of the plot 600 until a first time 610. At the time 610, the actual air pressure 602 begins to increase while an estimated air pressure 616 remains constant. The difference between the actual air pressure 602 and the estimated air pressure 616 corresponds to a pressure deviation 618. The ECU may determine the actual air pressure 602 from a pressure sensor, may determine the estimated air pressure 616 using data from a state estimator, and may determine the pressure deviation 618 by determining the difference between the actual air pressure 602 and the estimated air pressure 616.

Shortly after identifying the pressure deviation 618, the ECU (e.g., an observer controller) may determine that the restriction valve and the bypass valve are both deviated valves. In that regard, the ECU may adjust a flow resistance value that is assigned to each of the restriction valve and the bypass valve. As shown by the lines 604 and 606, the ECU may gradually adjust the flow resistance value until the pressure deviation approaches or reaches zero at a time 614. In particular, the ECU may gradually increase the flow resistance value of the restriction valve until the flow resistance value is an amount 626 greater than a pre-compensation flow resistance value 620. Likewise, the ECU may gradually increase the flow resistance value of the bypass valve until the flow resistance value is an amount 628 greater than a pre-compensation flow resistance value 622.

At the time 610 at which the pressure deviation 618 begins to occur, the actual pressure ratio across the compressor begins to increase in value and also increases relative to an estimated value of the pressure ratio (shown by a line 624). This causes the estimated value of the pressure ratio to become incorrect starting at the time 610. As a result of the compensation to the flow resistance values assigned to the restriction and bypass valves, the estimated value of the pressure ratio increases until the estimated pressure ratio is substantially the same as (i.e., within 5%, 10%, or 20%) the actual value of the pressure ratio.

Due to the newly accurate real-time or near-real-time values of the components of the fuel cell circuit, the ECU may accurately control the various actuators of the fuel cell circuit to achieve a desired operation of the compressed gas within the fuel cell circuit.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling gas flow in a fuel cell circuit of a vehicle comprising:
   a fuel cell stack having a plurality of fuel cells and configured to receive a gas;
   a pressure sensor configured to detect a pressure of the gas in the fuel cell circuit;
   a valve having a valve position and configured to adjust a flow of the gas through at least a portion of the fuel cell circuit; and
   an electronic control unit (ECU) coupled to the pressure sensor and the valve and configured to:
   estimate pressure values corresponding to pressures of the gas at multiple locations in the fuel cell circuit including at the fuel cell stack based on the detected pressure of the gas and based on flow resistance values including a flow resistance value of the valve, the estimated pressure values including an estimated sensor pressure value corresponding to an estimated pressure of the gas at a location of the pressure sensor;
   determine a pressure deviation between the detected pressure of the gas and the estimated sensor pressure value; and
   adjust the flow resistance value of the valve until a final flow resistance value of the valve is determined that causes the pressure deviation to be reduced to or below a threshold deviation amount.

2. The system of claim 1 further comprising a flow sensor configured to detect a flow rate of the gas in the fuel cell circuit, wherein the ECU is further configured to estimate the pressure values based on the detected flow rate of the gas.

3. The system of claim 1 wherein the ECU is further configured to estimate new pressure values using the final flow resistance value of the valve.

4. The system of claim 3 wherein the ECU is further configured to control the valve position based on at least one of the estimated new pressure values.

5. The system of claim 4 wherein the valve is a dynamic control valve and the ECU is further configured to at least one of continuously or periodically adjust the valve position based on the at least one of the estimated new pressure values.

6. The system of claim 4 further comprising a compressor configured to direct the gas through the fuel cell circuit, wherein the ECU is further configured to control the compressor based on at least another of the estimated pressure values.

7. The system of claim 3 further comprising a flow sensor configured to detect a flow rate of the gas in the fuel cell circuit, wherein the ECU is further configured to continuously or periodically estimate the new pressure values at the multiple locations using a real-time or near-real-time model of the fuel cell circuit that is based on newly detected pressure values from the pressure sensor and based on newly detected flow values from the flow sensor.

8. The system of claim 1 wherein the valve is at least one of a restriction valve located in series with and downstream from the fuel cell stack, an inlet valve located in series with and upstream from the fuel cell stack, or a bypass valve located in parallel with the fuel cell stack.

9. The system of claim 1 wherein:
the valve includes:
a restriction valve located in series with and downstream from the fuel cell stack,
an inlet valve located in series with and upstream from the fuel cell stack, and
a bypass valve located in parallel with the fuel cell stack;
the ECU is further configured to identify a deviated valve as at least one of the restriction valve, the inlet valve, or the bypass valve in which the pressure deviation occurred; and
the ECU is further configured to adjust the flow resistance value of the deviated valve in response to identifying the deviated valve.

10. The system of claim 1 wherein the ECU is configured to adjust the flow resistance values using a proportional-integral-derivative (PID) controller.

11. A system for controlling gas flow in a fuel cell circuit of a vehicle comprising:
a fuel cell stack having a plurality of fuel cells and configured to receive a gas;
a pressure sensor configured to detect a pressure of the gas in the fuel cell circuit;
a valve having a valve position and configured to adjust a flow of the gas through at least a portion of the fuel cell circuit;
a plurality of pipes configured to port the gas through the fuel cell circuit; and
an electronic control unit (ECU) coupled to the pressure sensor and the valve and configured to:
estimate pressure values corresponding to pressures of the gas at multiple locations in the fuel cell circuit including at the fuel cell stack and at least one of the plurality of pipes based on the detected pressure of the gas and based on flow resistance values including a flow resistance value of the valve and flow resistance values of the plurality of pipes, the estimated pressure values including an estimated sensor pressure value corresponding to an estimated pressure of the gas at a location of the pressure sensor;
determine a pressure deviation between the detected pressure of the gas and the estimated sensor pressure value; and
adjust the flow resistance value of the valve until a final flow resistance value of the valve is determined that causes the pressure deviation to be reduced to or below a threshold deviation amount.

12. The system of claim 11 further comprising a flow sensor configured to detect a flow rate of the gas in the fuel cell circuit, wherein the ECU is further configured to estimate the pressure values based on the detected flow rate of the gas.

13. The system of claim 11 wherein:
the ECU is further configured to estimate new pressure values using the final flow resistance value of the valve; and
the ECU is further configured to at least one of continuously or periodically adjust the valve position based on at least one of the estimated new pressure values.

14. The system of claim 13 further comprising a flow sensor configured to detect a flow rate of the gas in the fuel cell circuit, wherein the ECU is further configured to continuously or periodically estimate the new pressure values at the multiple locations using a real-time or near-real-time model of the fuel cell circuit that is based on newly detected pressure values from the pressure sensor and based on newly detected flow values from the flow sensor.

15. The system of claim 11 wherein the valve is at least one of a restriction valve located in series with and downstream from the fuel cell stack, an inlet valve located in series with and upstream from the fuel cell stack, or a bypass valve located in parallel with the fuel cell stack.

* * * * *